US011193775B2

(12) United States Patent
Beaurepaire et al.

(10) Patent No.: US 11,193,775 B2
(45) Date of Patent: Dec. 7, 2021

(54) METHOD AND APPARATUS FOR PROVIDING A DYNAMIC VIRTUAL CONNECTION THROUGH A SHARED VEHICLE

(71) Applicant: HERE GLOBAL B.V., Eindhoven (NL)

(72) Inventors: Jerome Beaurepaire, Berlin (DE); Sven Krome, Berlin (DE)

(73) Assignee: HERE Global B.V., Eindhoven (NL)

( * ) Notice: Subject to any disclaimer, the term of this patent is extended or adjusted under 35 U.S.C. 154(b) by 375 days.

(21) Appl. No.: 16/191,100

(22) Filed: Nov. 14, 2018

(65) Prior Publication Data

US 2020/0149903 A1    May 14, 2020

(51) Int. Cl.
*G01C 21/34* (2006.01)
*G01C 21/36* (2006.01)
*G08G 1/123* (2006.01)

(52) U.S. Cl.
CPC ..... *G01C 21/3423* (2013.01); *G01C 21/3438* (2013.01); *G01C 21/3676* (2013.01); *G08G 1/123* (2013.01)

(58) Field of Classification Search
CPC ............ G01C 21/3423; G01C 21/3438; G01C 21/3676; G08G 1/123
See application file for complete search history.

(56) References Cited

U.S. PATENT DOCUMENTS

| 9,534,913 | B2 | 1/2017 | Newlin et al. |
| 2011/0046881 | A1 | 2/2011 | Karaoguz |
| 2013/0226446 | A1* | 8/2013 | Nonner ................ G01C 21/00 701/400 |
| 2017/0074669 | A1 | 3/2017 | Newlin et al. |
| 2017/0167882 | A1 | 6/2017 | Ulloa Paredes et al. |
| 2017/0169366 | A1 | 6/2017 | Klein et al. |
| 2017/0254655 | A1* | 9/2017 | Kato ................... G06Q 10/047 |
| 2017/0268892 | A1 | 9/2017 | Singh et al. |

OTHER PUBLICATIONS

Jappinen et al., "Modelling the Potential Effect of Shared Bicycles on Public Transport Travel Times in Greater Helsinki: An Open Data Approach", Applied Geography 43 (2013), pp. 13-24.

(Continued)

*Primary Examiner* — Anshul Sood
(74) *Attorney, Agent, or Firm* — Ditthavong, Steiner & Mlotkowski

(57) ABSTRACT

An approach is provided for providing a dynamic virtual connection through a shared vehicle. A routing platform determines a dynamic location of a shared vehicle. The dynamic location is updated. The routing platform further creates a dynamic virtual connection between two or more fixed transportation stations. The dynamic virtual connection provides a route that connects the two or more fixed transportation stations with a route segment using the shared vehicle, and the dynamic virtual connection is updated as the dynamic location of the shared vehicle is updated. The routing platform further provides data for presenting a representation of the dynamic virtual connection in a mapping user interface.

20 Claims, 11 Drawing Sheets

(56) References Cited

OTHER PUBLICATIONS

Poletti et al., "Public Transit Route Mapping for Large-Scale Multimodal Networks", Article, International Journal of Geo-Information, retrieved on Nov. 14, 2018 from https://www.ethz.ch/content/dam/ethz/special-interest/baug/ivt/vt-dam/vpl/reports/1201-1300/ab1222.pdf, pp. 1-13.
Citymapper, "A letter from an ex-Seattleite", retrieved on Nov. 14, 2018 from https://content.citymapper.com/news/1465/a-letter-from-an-ex-seattleite-to-all-seattleites, pp. 1-2.
Office Action for corresponding European Patent Application No. 19206149.7-1001, dated Apr. 6, 2020, 8 pages.

* cited by examiner

METHOD AND APPARATUS FOR PROVIDING A DYNAMIC VIRTUAL CONNECTION THROUGH A SHARED VEHICLE

BACKGROUND

Service providers and automobile manufacturers are continually challenged to deliver value and convenience to consumers by, for example, providing compelling navigation services. One area of interest has been the development of intermodal transport routing that combines multiple transport modes (e.g., taxi, bus, train, bicycle, etc.) to reach a destination with a least amount of time. As shared vehicles (e.g., a car, a motorcycle, an electric bike, an electric scooter, a bicycle, etc.) become popular, some navigation mapping services include carsharing as one transport mode option among more traditional forms of transport (e.g., public transportation systems with fixed stations or hubs). However, these different forms of transportation have been presented as separate and distinct options. Accordingly, service provides face significant technical challenges to integrate multiple modes of transport to provide faster and more efficient transportation options to end users.

SOME EXAMPLE EMBODIMENTS

Therefore, there is a need for an approach for integrating share vehicles into traditional transport public transport modes such as subways, trains, buses, etc. that historically provide transportation services through fixed station locations.

According to one embodiment, a method comprises determining a dynamic location of a shared vehicle, wherein the dynamic location is updated. The method also comprises creating a dynamic virtual connection between two or more fixed transportation stations, wherein the dynamic virtual connection provides a route that connects the two or more fixed transportation stations with a route segment using the shared vehicle, and wherein the dynamic virtual connection is updated as the dynamic location of the shared vehicle is updated. The method further comprises providing data for presenting a representation of the dynamic virtual connection in a mapping user interface.

According to another embodiment, an apparatus comprises at least one processor, and at least one memory including computer program code for one or more computer programs, the at least one memory and the computer program code configured to, with the at least one processor, determine a dynamic location of a shared vehicle, wherein the dynamic location is updated. The apparatus is also caused to create a dynamic virtual connection between two or more fixed transportation stations, wherein the dynamic virtual connection provides a route that connects the two or more fixed transportation stations with a route segment using the shared vehicle, and wherein the dynamic virtual connection is updated as the dynamic location of the shared vehicle is updated. The apparatus is further caused to provide data for presenting a representation of the dynamic virtual connection in a mapping user interface.

According to another embodiment, a computer-readable storage medium carries one or more sequences of one or more instructions which, when executed by one or more processors, cause, at least in part, an apparatus to determine a dynamic location of a shared vehicle, wherein the dynamic location is updated. The apparatus is also caused to create a dynamic virtual connection between two or more fixed transportation stations, wherein the dynamic virtual connection provides a route that connects the two or more fixed transportation stations with a route segment using the shared vehicle, and wherein the dynamic virtual connection is updated as the dynamic location of the shared vehicle is updated. The apparatus is further caused to provide data for presenting a representation of the dynamic virtual connection in a mapping user interface.

According to another embodiment, an apparatus comprises means for determining a dynamic location of a shared vehicle, wherein the dynamic location is updated. The apparatus also comprises means for creating a dynamic virtual connection between two or more fixed transportation stations, wherein the dynamic virtual connection provides a route that connects the two or more fixed transportation stations with a route segment using the shared vehicle, and wherein the dynamic virtual connection is updated as the dynamic location of the shared vehicle is updated. The apparatus further comprises means for providing data for presenting a representation of the dynamic virtual connection in a mapping user interface.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing a dynamic virtual connection through a shared vehicle are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
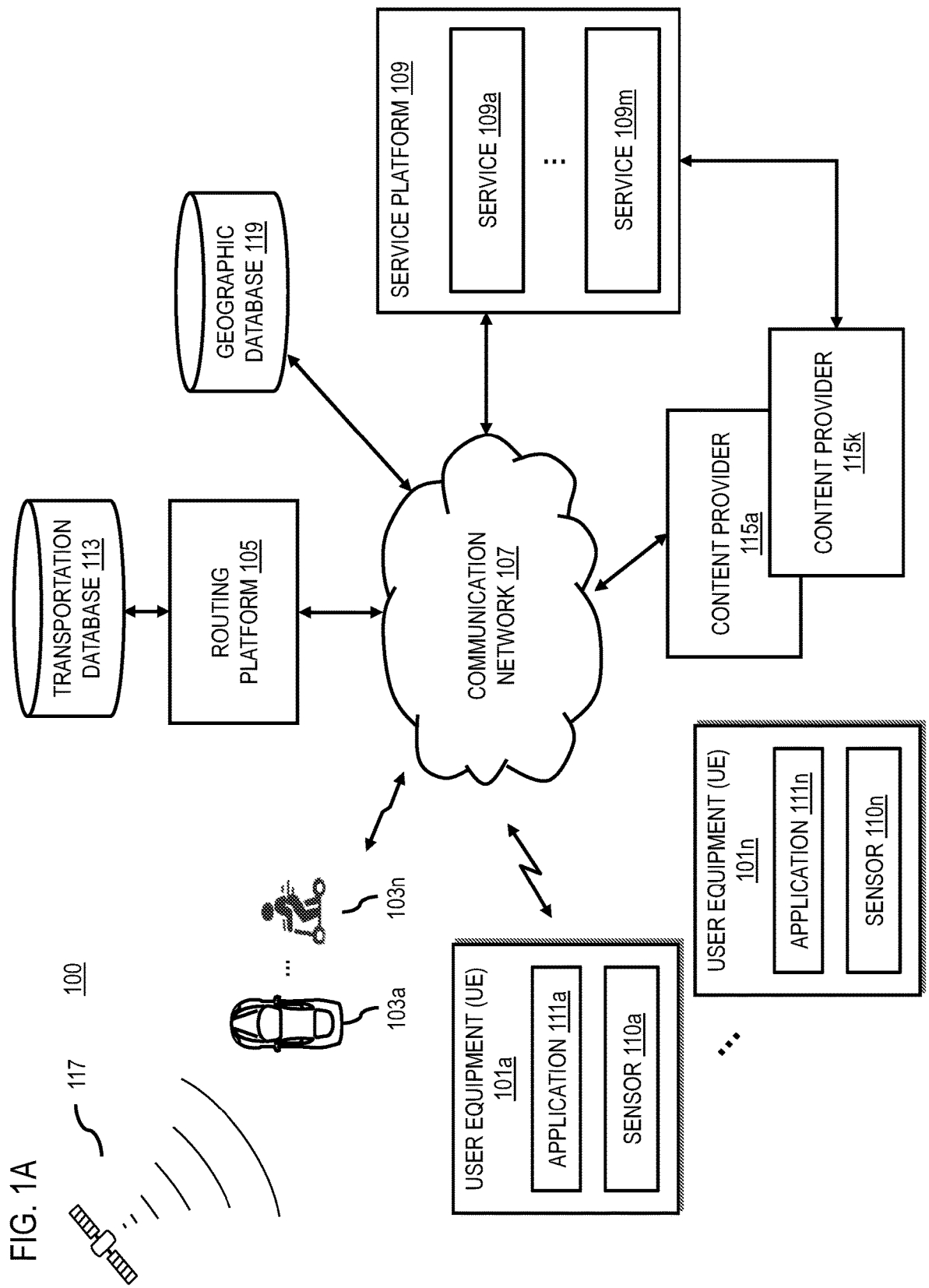
FIG. 1A is a diagram of a system for providing a dynamic virtual connection through a shared vehicle, according to one embodiment.

FIG. 1A is a diagram of a system for providing a dynamic virtual connection through a shared vehicle, according to one embodiment. In many areas (particularly urban areas), public transportation is a popular and significant form of transportation for many users. Public transport or transit networks typically include transportation stations (e.g., trains stations, subway stations, bus stops, etc.) that are located throughout a geographic area to provide fixed locations where users can board or disembark from public transport vehicles. For most localities, each of these stations and their corresponding public transport networks represent infrastructure that requires significant development and costs. Therefore, there usually is only a limited number of transportation stations available to cover an area. As result, a traditional user typically will have to travel from the user's starting location to the closest transportation station, use the public transport network to travel to another transportation station closest to the user's destination, and then travel from that terminating station to the user's final destination. Depending on the density of stations within a public transportation the distances that the user would have to travel to and from stations of the public transportation network can be considerable.

At the same time, vehicle sharing services are also becoming popular transport options for end users. A shared vehicle, for instance, can be any type of vehicle such as but not limited to cars, bicycles, scooters, etc. offered for public use by a vehicle sharing service or equivalent entity. In general, however, shared vehicles have acted as a competing service to public transportation networks. For example, if a public transportation station is not conveniently located to a user or where the user wants to go, the user may take a shared vehicle instead. Thus, service providers face significant technical challenges to integrating the use of public transportation networks with shared vehicles to improve travel times or efficiency. Moreover, even if the transport modes were integrated, service providers face additional technical challenges to presenting the integrated public transport/share vehicle options to end users to enable users to visualize or otherwise discover transportation options (or combinations) that were not always apparent or easy to perceive.

To address this problem, a system 100 of FIG. 1A introduces a capability to allow users to have personalized city maps that consider their mobility capabilities by combining shared vehicles or devices (e.g., cars, bicycles, scooters, etc.) with public transport networks. In one embodiment, the system 100 looks for potential "dynamic virtual connections" (e.g., virtual shortcuts) between public transport stations created by the presence or availability of shared vehicles that are freely floating (as opposed to those shared vehicles sitting on docking stations and/or parking at designated areas). A dynamic virtual connection or shortcut represents a route between two fixed transportation stations that can be traveled using a shared vehicle or device to decrease overall travel time, distance, etc. These connections are dynamic based on the data on the availability and/or location of the shared vehicles. For example, as a shared vehicle becomes available at a time and/or location needed by a user to connect between two transportation stations, the connection can be created by the system 100. As another example, the system 100 computes the probability of a dynamic virtual connection to be present at a given time based on previously recorded data and statistical analysis, e.g., "there is 80% chance of this virtual connection being available on Mondays at 5 pm". In addition, the connection is virtual because it is not an official or permanent part of the public transportation network. For example, a dynamic virtual connection is valid only when the involved shared vehicle is available at or near the location. Once the shared vehicle is reserved or moved away by another user, the dynamic virtual connection becomes invalid. Therefore, such connections are usually valid "in real-time" or substantially real-time, and should not be counted on to plan for a trip hours ahead.

In one embodiment, the system 100 can then create a personalized map with the dynamic virtual connections or shortcuts enabled by the shared vehicle. The personalized map, for instance, can be based on an existing representation of the public transport map that is dynamically redrawn by the system 100 to depict the dynamic virtual connections. In one embodiment, the system can depict the dynamic virtual connection and the two transportation stations linked by the dynamic virtual connection as a single "virtual station" of the public transportation network. The system 100 can also use a special layout or other user interface elements to differentiate what is the original public transportation network and the dynamic virtual connections created by shared vehicles.

In other words, the system 100 enables a user to take advantage of both transit networks with fixed transportation stations, schedules and/or routes (e.g., public buses, subways, trains, ferries, airplanes, etc.) as well as shared vehicles, considering user context and then presenting the transit networks synergized with shared vehicles, without overwhelming the user. In one embodiment, the system 100 provides data for presenting a representation of dynamic virtual connections between transit networks and share vehicles in a mapping user interface, for users to see the synergized transit networks. The synergized transit networks provide a snapshot/overview of the intermodal options in an area of interest (e.g., dynamic virtual connections and virtual stations) to the users at a requesting time point.

By way of example, a shared vehicle may be human-operated, semi-autonomous, and/or autonomous, such as a car, a motorcycle, an electric bike, an electric scooter, a bicycle, a boat, a shuttle, a van, a bus, a helicopter, an airplane, etc. The shared vehicles may be owned by an individual (e.g., the user, a stranger to the user, a contact of the user, etc.), a group of individuals, a business entity, a public entity, or an ad hoc grouping. These embodiments are applicable to vehicle rental, centralized ride-sharing, peer-to-peer ride-sharing, car-pooling, personal vehicle usage, etc.

As mentioned, shared vehicles can be more flexible in that many have no fixed locations or operation schedules. For example, shared vehicles can be picked up and dropped off at almost any location without having to return them to a designated location. In one embodiment, the system 100 determines a dynamic location of each shared vehicle. For example, the system 100 determines the dynamic location at a requesting time point per user's demand. In another embodiment, the system 100 determines and/or updates the dynamic location. The dynamic location may be updated once, more than once or periodically (e.g., per second, per minute, per 5 minutes, per hour, etc., or at other intervals that may be regular, irregular, intermittent or varying, or from time-to-time, or that may change) as set by the system 100 or by the user.

In one embodiment, the system 100 creates a dynamic virtual connection including a route that connects two or more fixed transportation stations (e.g., Smithsonian Station) of a transit network (e.g., Washington D.C. METRO transit network) with a route segment using the shared vehicle (e.g., a dock-less shared bike parking in front of the Smithsonian Castle). The system 100 updates the dynamic virtual connection as the dynamic location of the shared vehicle is updated (e.g., the dock-less shared bike is just ridden by a user from the Smithsonian Castle to the National Museum of Natural History).

In another embodiment, the system 100 creates a dynamic virtual connection including a route that connects from a micro-transit route to one or more public transportation stations. In yet another embodiment, the system 100 creates a dynamic virtual connection including a route that connects from micro-transit routes using shared vehicles. Micro-transit, for instance, is a form of Demand Responsive Transit (DRT) that offers flexible routing and/or flexible scheduling of minibus vehicles.

In another embodiment, the system 100 determines a dynamic location of a personal vehicle associated with a user, and creates the dynamic virtual connection further based on the dynamic location of the personal vehicle. For example, the system 100 determines a dynamic location of a personal bicycle (e.g., locked on a bicycle post near a METRO station), and draws a dynamic virtual connection from the METRO station and the user's home as the last segment. As another example, the system 100 determines to use the user's autonomous vehicle to transfer from the airport to the user's office.

In one embodiment, the system 100 creates the dynamic virtual connection based on determining that the dynamic virtual connection reduces a travel time, a travel distance, and/or a travel cost, between the two or more fixed transportation stations in comparison to the actual/non-dynamic route between the two or more fixed transportation stations. For example, the system 100 creates a dynamic virtual connection between the Foggy Bottom Station and the Farragut West Station using a shared bicycle parking near the Foggy Bottom Station, since it is faster to jump on a bicycle right away than waiting for the next train to ride between the two stations.

As another example, the system 100 creates a dynamic virtual connection between the Foggy Bottom Station and the Farragut North Station using a shared bicycle parking near the Foggy Bottom Station, since it is cheaper and faster to ride a bicycle between the two stations than switching between two different METRO lines at another station.

In another embodiment, the system 100 creates the dynamic virtual connection based on determining that the dynamic virtual connection reduces a travel time, a travel distance, and/or a travel cost, across transit networks using a shared vehicle in-between transit stations of different transport modes. For example, the system 100 creates a dynamic virtual connection between the Foggy Bottom Train Station and the Kennedy Center shuttle bus stop using a shared bicycle parking near the Foggy Bottom Station, since it is faster to ride a bicycle between the two locations than waiting for a Kennedy Center shuttle bus.

In other embodiments, the system 100 creates the dynamic virtual connection based on at least one of: a distance between the shared vehicle and the two or more fixed transportation stations, an ease of using the shared vehicle to connect the two or more fixed transportation stations, an accessibility of the two or more fixed transportation stations (e.g., with lifts or elevators for a user's wheelchair, and a type of transport provided by the two or more fixed transportation stations being connected. For example, the system 100 creates a dynamic virtual connection when a distance between the shared vehicle and the closest fixed transportation station is shorter than a threshold distance. Such threshold distance varies depending on the type of shared vehicles, user preferences, and/or user context. If the user is carrying a big shopping bag full of grocery, the shared vehicle may be an electrical scooter with a big basket and the threshold distance may be two miles.

As another example, the system 100 creates a dynamic virtual connection when an ease of using the shared vehicle to connect the two fixed transportation stations is a concern. If the user does not know how to ride a bicycle, the shared vehicle may be a 3-wheel electrical car and the threshold distance may be five miles. As yet another example, the system 100 creates a dynamic virtual connection depending on a type of transport (e.g., buses, trains, ferries, subway, cable cars, commuter rails, trolleybuses, trams, etc.) provided by the two or more fixed transportation stations being connected. If the fixed transportation stations are ferry boat terminals, the shared vehicles may be a nearby water taxi.

In other embodiments, the system 100 creates the dynamic virtual connection based on a user preference with respect to at least one of: a vehicle type of the shared vehicle (e.g., a car, a motorcycle, an electric bike, an electric scooter, a bicycle, a water taxi, etc.), the vehicle type that is preferred based on a selected distance, a vehicle brand of the shared vehicle, a vehicle sharing service providing the shared vehicle (e.g., Mobike, LimeBike, Spin, etc. in Washington D.C.), a maximum distance from a first station of the two or more fixed transportation stations and the shared vehicle (i.e., the shared vehicle is within a 100 feet radius of the first station), and a maximum distance covered between the two or more fixed transportation stations using the shared vehicle (i.e., at most 2 miles bicycle ride).

In one embodiment, the system 100 presents the dynamic virtual connection between two or more transportation stations in a color, shape, and/or style different from the actual/non-dynamic connection between the two or more fixed transportation stations. For example, the representation of the dynamic virtual connection in the map user interface depicts the two or more fixed transportations connected by the dynamic virtual connection as a gray line on a map of a transportation network while the actual/non-dynamic connection between the two or more fixed transportation stations as a solid line.

In one embodiment, the system 100 groups the two or more transportation stations into a virtual station shown on the map of the transportation network, in a color, shape, and/or style different from the dynamic virtual connection between two or more transportation stations. For example, the representation of the dynamic virtual connection in the map user interface depicts the two or more fixed transportations connected by the dynamic virtual connection as a gray line, while the virtual station is presented as a joint station similar to a fixed joint station yet in gray.

In another embodiment, the system 100 further groups a virtual station based on user context and/or user preferences. For example, the grouping could be different for each user based on user's "abilities" to use an e-roller, a bike, a scooter, etc. Among others, the user's context and/or preferences could contain: generally preferred vehicles types (e.g., bikes vs e-bikes vs scooters vs rollers, etc.), preferred vehicles types for a selected vehicle distance (e.g., an e-roller if distance <1 km, and a bike up to 4 km, then scooters), preferred vehicle brands in order (Lidl bikes vs Ofo vs Mobike vs Coup, etc.), subscribed shared vehicle services (e.g., Lidl bikes but not Ofo), a maximum walking distance from a fixed station to pick a shared vehicle (e.g., 300 m), a maximum distance to be covered between two fixed stations using a shared vehicle (e.g., 1.5 km), etc.

The system 100 may group the two or more transportation stations into a virtual station based on at least one of: a distance between the shared vehicle and the two or more fixed transportation stations, an ease of using the shared vehicle to connect the two or more fixed transportation stations, and a type of transport provided by the two or more fixed transportation stations being connected.

In other embodiments, the system 100 groups several transportation stations into a virtual station based on at least one of: a distance between the fixed transportation stations, an ease of using the shared vehicle to connect the fixed transportation stations, and a type of transport provided by the fixed transportation stations (e.g., a bus, a train, a tram, etc.) being connected.

In one embodiment, the system 100 redraws the mapping user interface on a display device based on the updating of the dynamic location of the shared vehicle (e.g., the dock-less shared bike is just ridden by a user from the National Museum of Natural History to the White House), and/or the dynamic virtual connection (e.g., another dock-less shared bike is just ridden by another user from the White House to the National Museum of Natural History).

In one embodiment, the system 100 selects the shared vehicle based on determining that the vehicle is within a threshold vicinity of from the two or more transit stations within an area of interest. In another embodiment, the system 100 selects the shared vehicle based on determining that the vehicle is within a threshold vicinity of from two or more transit stations of interest.

In one embodiment, the system 100 determines an availability of the shared vehicle from a vehicle sharing service, and then selects the shared vehicle based on the availability. For example, the vehicle sharing service may have a contact with the system 100 as the only or preferred vehicle sharing service. As another example, the system 100 determines vehicle sharing service based on user context (e.g., the user has registered with the vehicle sharing service) and/or user preferences (e.g., the user and/or other users frequently use the vehicle sharing service). The system 100 monitors and learns popular "virtual connections" when the user uses the relevant shared vehicles. The system 100 can make reservations of available shared vehicles on the popular "virtual connections" when the user is approaching or is going to approach the popular "virtual connections."

In one embodiment, the system 100 updates dynamic virtual connections and/or virtual stations based on real-time information of shared vehicles, fixed transportation networks, user context, and/or user preferences. In one embodiment, the system 100 presents the dynamic virtual connections and/or virtual stations as snapshots in a map. In another embodiment, the system 100 presents the dynamic virtual connections and/or virtual stations as "morphing" animation reflecting those updates in a map.

In one embodiment, the system 100 optimizes a user's travel time (or route or other routing cost function parameter such as distance, fuel efficiency, etc.) to a destination by considering all possible modes of transport (e.g., public transport buses, trains, shared vehicles, etc.) along with the user's own vehicle (e.g., a private autonomous vehicle). In one embodiment, the system 100 can use two-dimensional isoline routing, dynamic (or real time) traffic monitoring and timing adjustments to identify dynamic virtual connections and/or virtual stations and optimal multimodal routes via one or more dynamic virtual connections, to one or more virtual stations, and/or ultimately to the final destination. Optimal, for instance, refers to dynamic virtual connections and/or virtual stations that enable the user to reach a final destination of the route with a time, distance, etc. that meets threshold requirements or is a minimum among calculated candidate routes and/or locations. As indicated, route can be a multimodal route that combines the use of multiple different modes of transport. For example, a multimodal route can direct a user to walk to a first location, then take a shared vehicle via one or more dynamic virtual connections to the destination or to pick up the user's own vehicle then drive to the destination.

In one embodiment, the system 100 can determine transport availability information (e.g., either the availability of transport modes or the unavailability of transport modes) based on static transport schedule data, and/or real-time transport tracking data. By way of example, the transport modes may include a public transit mode.

In one embodiment, the system 100 includes one or more processes for automatically determining if and where a user may need a route that includes one or more dynamic virtual connections between two or more fixed transportation stations, and an online service collecting routing information and providing guidance to the user to reach the destination faster and/or cheaper including the one or more dynamic virtual connections and/or virtual stations generated according to the embodiments described herein. In one embodiment, the system 100 receives a user request to explicitly pass via one or more dynamic virtual connections and/or virtual stations to travel to a destination. Alternatively, the user can request a route to a final destination such that one possible candidate route or the best calculated route (e.g., route taking the least amount of travel time and/or distance) includes one or more dynamic virtual connections and/or virtual stations. In another embodiment, the system 100 detects a user travel pattern/habit and predicts the user's need for passing via one or more dynamic virtual connections and/or virtual stations to reach a destination. In yet another embodiment, the system 100 detects the user's need for passing via one or more dynamic virtual connections and/or virtual stations from an entry in the user's calendar, a social media event accepted or signed up by the user, an event in the user's message (e.g., email, text message, instant message, SMS message, MMS message, etc.).

In one embodiment, UEs 101 of a user and sensors in a vehicle 103 are collecting and reporting data (e.g., location data) to the system 100 to support the determining of one or more dynamic virtual connections, virtual stations, and/or multimodal routing according to the embodiments described herein. In this way, for instance, vehicles 103a-103n and/or vehicle users can use the system for sharing trajectory data and receiving shared vehicle supply and demand information as well as contextual data (e.g., traffic, weather conditions, etc.) that can be used to dynamically update the one or more dynamic virtual connections, virtual stations, and/or multimodal routing that optimizes or reduces the amount of time, distance, etc. to a destination. With this data along with other data such as but not limited to public transport information and vehicle information, the system 100 (e.g., a routing platform 105) can compute candidate routes to a destination that include one or more dynamic virtual connections and/or virtual stations then traveling to the final destination. In this way, the system 100 can more precisely present to the user transport modes to travel via one or more dynamic virtual connections and/or virtual stations then get to the destination. In one embodiment, the UEs 101 and the routing platform 105 have connectivity via a communication network 107.

In one embodiment, the vehicles 103a-103n are equipped with a device (e.g., the UE 101 or other accessory device) that records the vehicles' trajectory data (e.g., position, speed, etc.). In one embodiment, the UE 101 may be configured with one or more sensors 110a-110n (also collectively referred to as sensors 110) for determining the trajectory data (including parking locations). By way of example, the sensors 110 may include location sensors (e.g., GPS), accelerometers, compass sensors, gyroscopes, altimeters, etc.

In one embodiment, after the dynamic virtual connections and/or virtual stations are determined, they are processed (e.g., by respective applications 111a-111n and/or the routing platform 105) for storage in, for instance, a transportation database 113 and/or a geographic database 119) to make them accessible for private and/or public entities. For example, public transport agencies, can incorporate the dynamic virtual connections and/or virtual stations into the transportation networks on their own or by partnering with the system 100.

In one embodiment, after a journey or the trajectory data is recorded (e.g., upon parking), the trajectory data is analyzed (e.g., by respective applications 111a-111n and/or the routing platform 105 for storage in, for instance, a transportation database 113 and/or a geographic database 119) to detect parking locations. In one embodiment, timestamp information indicating at which time and which location the vehicle was parked is recorded as a record in the transportation database 113. In one embodiment, the record is then transmitted or uploaded to the routing platform 105. In addition or alternatively, the raw trajectory data may be uploaded to the routing platform 105 to determine the record. In yet another embodiment, the record and/or trajectory data may be maintained at the UE 101 device for local processing to determine vehicle parking information for transmission to the routing platform 105 and/or other vehicles/UEs 101 (e.g., when operating in a peer-to-peer network architecture).

In one embodiment, when the UE 101 requests optimal routes, the routing platform 105 computes candidate routes that include one or more dynamic virtual connections and/or virtual stations then riding to a destination, based on data from the transportation database 113 and/or the geographic database 119. The public transport mode may include one or more buses, one or more trains, one or more subways, one or more ferries, or a combination thereof.

In one embodiment, the routing platform 105 is configured to monitor the user, the public transport modes, and the shared vehicle in order to generate travel status information. In addition, the routing platform 105 may present to the user a real-time status of the vehicle and/or an estimated or predicted status of the vehicle to arrive at a fixed transportation station. The status information may also be associated with timestamp information and/or other contextual information (including parking) to store in the transportation database 113. In one embodiment in which timestamp information is available, for each travel or street segment of interest, the routing platform 105 retains the latest time at which a vehicle departed and estimates when the vehicle will arrive at the fixed transportation station.

In one embodiment, the routing platform 105 may present to the user information on points of interest, parking areas, road segments, and/or related information retrieved from the geographic database 119, while the user is traveling on the transport modes and the shared vehicles. In addition or alternatively, such information can be provided by the service platform 109, one or more services 109a-109m (also collectively referred to as services 109), one or more content providers 115a-115k (also collectively referred to as content providers 115), or a combination thereof. For example, the sources of the information may include map data, information inferred from data collected from participating vehicles, or a combination thereof.

In one embodiment, when a vehicle 103 requests instructions to find parking or stopping spot at or near the fixed transportation station at the end of the dynamic virtual connection, the routing platform 105 computes a route to the fixed transportation station, assuming there is no delay of the estimated arrival time of the shared vehicle. In another embodiment, the routing platform 105 computes a route to the fixed transportation station, when detecting there is traffic and/or weather delay of the estimated arrival time of the shared vehicle.

In one embodiment, apart from an optimal or recommended candidate route, the routing platform 105 may also update the information as a map overlay that illustrates, for instance, timestamps, a number of alternate transport modes available, and fluctuations in the amount of alternate transport modes, etc. around the user location or position (e.g., a current location of the client UE 101), based on real-time transport data from the transportation database 113.

In one embodiment, vehicles 103 are equipped with a navigation device (e.g., a UE 101) that is capable of submitting to the routing platform 105 requests for routing the user and the vehicle and of guiding of the user and the vehicle respectively. In one embodiment, as the user and the vehicle follow the respective segments, the UE 101 (e.g., via a navigation application 111) and the vehicle 103 may iterate their locations with timestamps to the routing platform 105 in order to update the travel status in a real-time and/or substantially real-time manner while factoring in delay caused by traffic, weather, etc.

In one embodiment, a routing request can be triggered by interactions with a user interface of the UE 101 (e.g., an explicit request from a user without any vehicle or the user wanting the user's own vehicle), or automatically when inferring the user's need from user profile information and/or user context information. In yet another embodiment, the UE 101 can initiate a routing request when the UE 101 detects that the user mentions a dynamic virtual connection need in an email, calendar entry, web post, etc. In this way, dynamic virtual connection information can be provided even when no explicit routing request is set or known by the system 100.

As shown in FIG. 1A, the routing platform 105 operates in connection with UEs 101 and vehicles 103 for providing a dynamic virtual connection through a shared vehicle. By way of example, the UEs 101 may be any mobile computer including, but not limited to, an in-vehicle navigation system, vehicle telemetry device or sensor, a personal navigation device ("PND"), a portable navigation device, a cellular telephone, a mobile phone, a personal digital assistant ("PDA"), a wearable device, a camera, a computer and/or other device that can perform navigation or location based functions, i.e., digital routing and map display. In some embodiments, it is contemplated that mobile computer can refer to a combination of devices such as a cellular telephone that is interfaced with an on-board navigation system of an autonomous vehicle or physically connected to the vehicle for serving as the navigation system. Also, the UEs 101 may be configured to access a communication network 107 by way of any known or still developing communication protocols. Via this communication network 107, the UE 101 may transmit probe data as well as access various network based services for facilitating providing a dynamic virtual connection through a shared vehicle.

Also, the UEs 101 may be configured with navigation applications 111 for interacting with one or more content providers 115, services of the service platform 109, or a combination thereof. Per these services, the navigation applications 111 of the UE 101 may acquire routing instructions, transport mode information, traffic information, mapping information and other data associated with the current locations of the user and the vehicle, etc. Hence, the content providers 115 and service platform 109 rely upon the gathering of user, vehicle, and transport modes trajectory data and routing data for executing the aforementioned services.

The UEs 101 and the vehicles 103 may be configured with various sensors 110 for acquiring and/or generating trajectory data regarding the user, a vehicle, other vehicles, conditions regarding the driving environment or roadway, etc. For example, sensors 110 may be used as GPS receivers for interacting with one or more satellites 117 to determine and track the current speed, position and location of a user and/or a vehicle travelling along a roadway. In addition, the sensors 110 may gather tilt data (e.g., a degree of incline or decline of the vehicle during travel), motion data, light data, sound data, image data, weather data, temporal data and other data associated with UEs 101 and/or the vehicle 103 thereof. Still further, the sensors 110 may detect local or transient network and/or wireless signals, such as those transmitted by nearby devices during navigation of a vehicle along a roadway. This may include, for example, network routers configured within a premises (e.g., home or business), another UE 101 or vehicle 103 or a communicable traffic system (e.g., traffic lights, traffic cameras, traffic signals, digital signage). In one embodiment, the routing platform 105 aggregates probe data gathered and/or generated by the UEs 101 and/or the vehicle 103 resulting from the driving of multiple different vehicles over a road/travel network. The probe data may be aggregated by the routing platform 105 to provide a dynamic virtual connection through a shared vehicle.

By way of example, the routing platform 105 may be implemented as a cloud based service, hosted solution or the like for performing the above described functions. Alternatively, the routing platform 105 may be directly integrated for processing data generated and/or provided by service platform 109, content providers 115, and/or applications 111. Per this integration, the routing platform 105 may perform candidate routes calculation based on user/vehicle trajectory information and/or public transport information.

By way of example, the communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UEs 101, the vehicles 103, the routing platform 105, the service platform 109, and the content providers 115 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
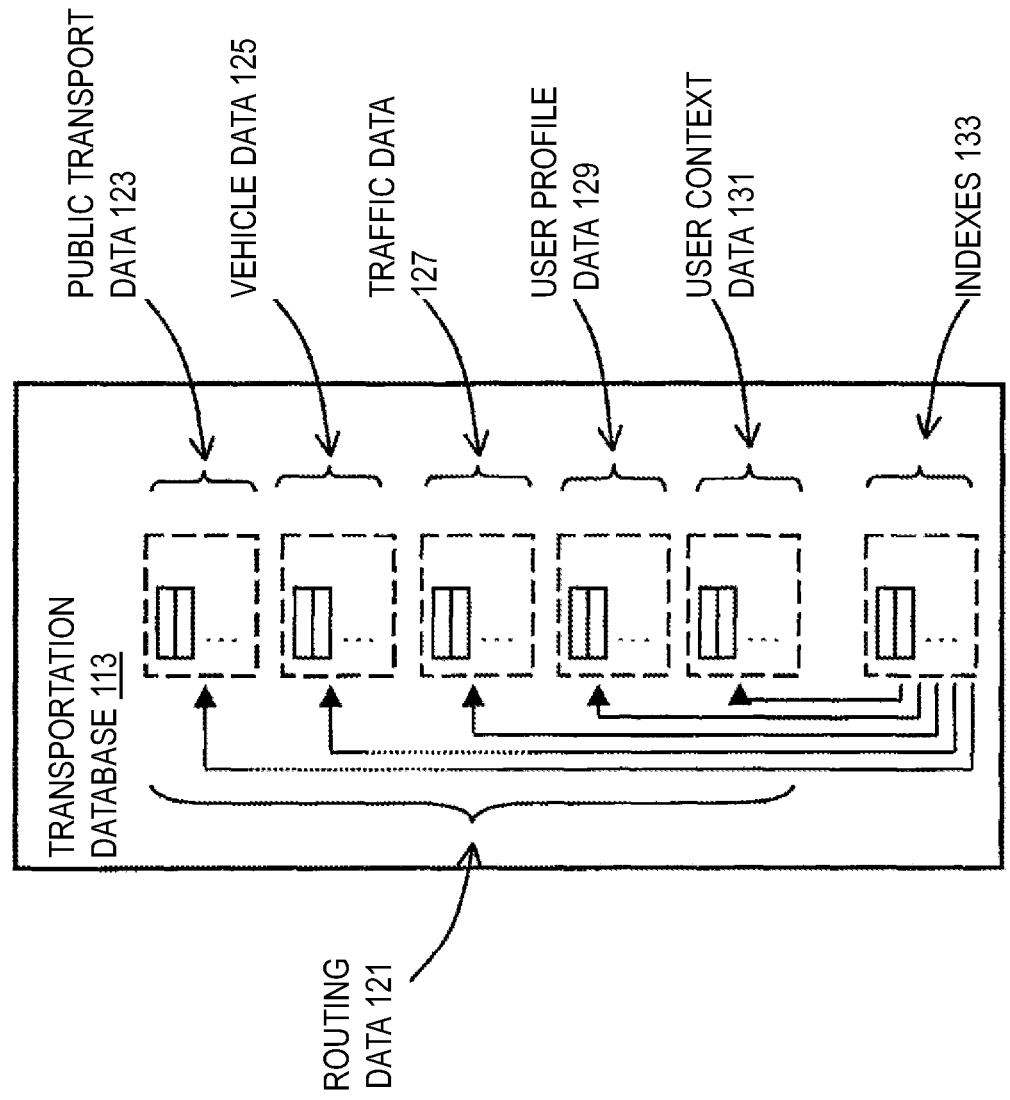
FIG. 1B is a diagram of a transportation database, according to one embodiment.

FIG. 1B is a diagram of the transportation database 113, according to one embodiment. In one embodiment, vehicle information and/or any other information used or generated by the system 100 with respect to providing a dynamic virtual connection through a shared vehicle based on routing data 121 stored in the transportation database 113, and associated with and/or linked to the geographic database 119 or data thereof.

In one embodiment, the routing data 121 include public transport data 123, vehicle data 125, traffic data 127, user profile data 129, user context data 131, indexes 133, etc. In one embodiment, the public transport data 123 can include any public transport data item used by the routing platform 105 including, but not limited to public transport type data, public transport schedule data, public transport route and stop data, real-time public transport trajectory data, etc. retrieved from transit agencies, public transportation operators, etc. In one embodiment, the public transport data can be used in junction with the user profile data 129 and the user context data 131 for creating one or more dynamic virtual connections and/or virtual stations then routing a user to a destination. In another embodiment, the traffic data 127 is further included for creating one or more dynamic virtual connections and/or virtual stations then routing a user to a destination. The public transport data format may be in General Transit Feed Specification (GTFS), REST/XML, or other industry standards for publishing transportation network and schedule data. In one embodiment, the public transport include fixed-route services such as city buses, trolleybuses, trams (or light rail) and passenger trains, rapid transit (metro/subway/underground, etc.), ferries, airlines, coaches, intercity rail, etc.

In one embodiment, the vehicle data 125 can include any vehicle data item used by the routing platform 105 including, but not limited to vehicle type data, vehicle ownership data, vehicle route and step data, real-time vehicle trajectory data, parking instance data, timestamp information for the parking instance data, etc. for creating one or more dynamic virtual connections and/or virtual stations then routing a user to a destination. In another embodiment, the traffic data 127 is further included for estimating the estimated arrival time for the vehicle to arrive the virtual stations and then the destination.

In one embodiment, the traffic data 127 includes, but not limited to, travel speeds, congestions, detours, vehicle types and volumes, accidents, road conditions, road works, etc. on specific road segments.

In one embodiment, the user profile data 129 includes, but not limited to, shared vehicle service registration information, preferred shared vehicle type, model, and service information, the name, name, login named, screen named, nicknamed, handle names, home addresses, email addresses, government identification numbers, operator license/credential types (motorcycle, regular passenger vehicle, commercial vehicle, etc.), vehicle registration plate numbers, face, fingerprints, handwriting, credit card numbers, digital identities, date of birth, age, birthplace, genetic information (e.g., gender, race, etc.), telephone numbers, marriage status/records, criminal records, purchase records, financial data, activity records, employment records, insurance records, medical records, political and non-political affiliations, preferences (e.g., POIs), calendar data, driving history data, vehicle sharing data, etc. of the driver/requesting user.

In one embodiment, the user context data 131 includes, but not limited to, a destination of the requesting user, a type of the destination of the user, a proximity of the user location to a shared vehicle, one or more dynamic virtual connections, one or more virtual stations, or the destination, availability of an alternate destination for the user, a number of passengers accompanying the user, weather data in the vicinity of the user, etc.

More, fewer or different data records can be provided in the transportation database 113. One or more portions, components, areas, layers, features, text, and/or symbols of the routing data records in the transportation database 113 can be stored in, linked to, and/or associated with one or more of the data records of the geographic database 119 (such as mapping and/or navigation data).

In one embodiment, the geographic database 119 includes geographic data used for (or configured to be compiled to be used for mapping and/or navigation-related services, such as for route information, service information, estimated time of arrival information, location sharing information, speed sharing information, and/or geospatial information sharing, according to exemplary embodiments. For example, the geographic database 119 includes node data records, road segment or link data records, POI data records, parking availability data records, and other data records.

In exemplary embodiments, the road segment data records are links or segments representing roads, streets, or paths, as can be used in the calculated route or recorded route information. The node data records are end points corresponding to the respective links or segments of the road segment data records. The road link data records and the node data records represent a road network, such as used by vehicles, cars, and/or other entities. Alternatively, the geographic database 119 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as traffic controls (e.g., stoplights, stop signs, crossings, etc.), gasoline stations, hotels, restaurants, museums, stadiums, offices, automobile dealerships, auto repair shops, buildings, stores, parks, etc. The geographic database 119 can include data about the POIs and their respective locations in the POI data records. The geographic database 119 can also include data about places, such as cities, towns, or other communities, and other geographic features, such as bodies of water, mountain ranges, etc.

The transportation database 113 and/or the geographic database 119 can be maintained by the content provider in association with the service platform 109 (e.g., a map developer). The map developer can collect driving/parking data and geographic data to generate and enhance the transportation database 113 and/or the geographic database 119. There can be different ways used by the map developer to collect data. These ways can include obtaining data from other sources, such as municipalities or respective geographic authorities.

The transportation database 113 and/or the geographic database 119 can be stored in a format that facilitates updating, maintenance, and development of the relevant data. For example, the data in the transportation database 113 and/or the geographic database 119 can be stored in an Oracle spatial format or other spatial format. The Oracle spatial format can be compiled into a delivery format, such as a geographic data files (GDF) format to be compiled or further compiled to form geographic database products or databases, which can be used in end user navigation devices or systems.

As mentioned above, the transportation database 113 and the geographic database 119 are separated databases, but in alternate embodiments, the transportation database 113 and the geographic database 119 are combined into one database that can be used in or with end user devices (e.g., UEs 101) to provide navigation-related functions and provide shared vehicle information. For example, the databases 113, 119 are assessible to the UE 101 directly or via the routing platform 105. In another embodiments, the databases 113, 119 can be downloaded or stored on UE 101, such as in applications 111.

Figure 2:
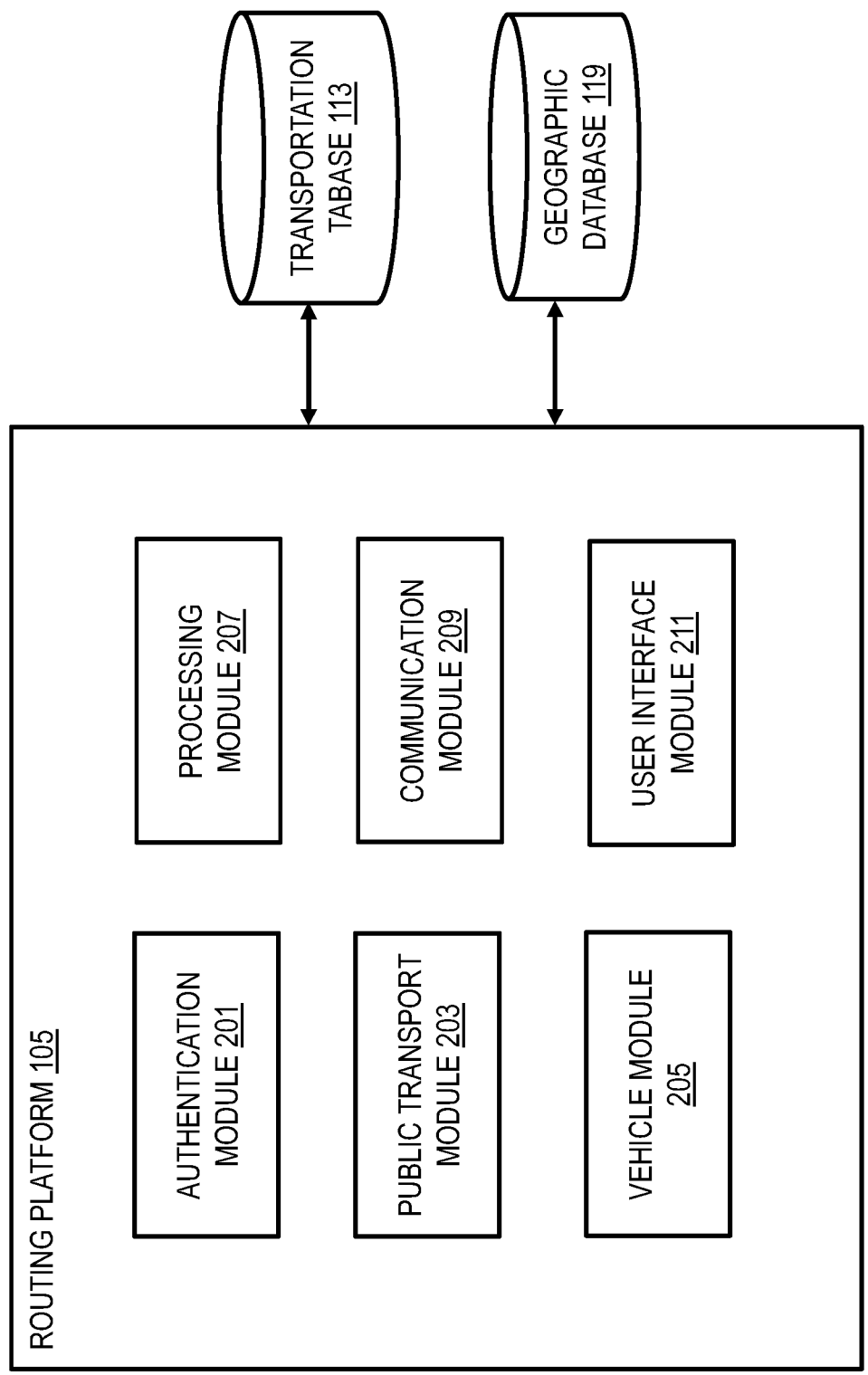
FIG. 2 is a diagram of the components of a routing platform, according to one embodiment.

FIG. 2 is a diagram of the components of a routing platform, according to one embodiment. By way of example, the routing platform 105 includes one or more components for providing a dynamic virtual connection through a shared vehicle. It is contemplated that the functions of these components may be combined or performed by other components of equivalent functionality. In this embodiment, the routing platform 105 includes an authentication module 201, a public transport module 203, a vehicle module 205, a processing module 207, a communication module 209, and a user interface module 211.

In one embodiment, the authentication module 201 authenticates UEs 101 and/or associated vehicles 103 for interaction with the routing platform 105. By way of example, the authentication module 201 receives a request to access the routing platform 105 via an application 111. The request may be submitted to the authentication module 201 via the communication module 209, which enables an interface between the navigation application 111 and the platform 105. In addition, the authentication module 201 may provide and/or validate access by the UE 101 to upload trajectory data, and/or other location-based information to the platform 105. In one embodiment, the authentication module 201 may further be configured to support and/or validate the formation of profile by a provider of a service 109 or content provider 115, e.g., for supporting integration of the capabilities for providing a dynamic virtual connection through a shared vehicle with said providers 115 or services 109.

The public transport module 203 retrieves the public transport data 123 (including fixed-route and/or fixed-schedule public transports and associated schedules and timestamps) from various sources such as the transportation database 113, transit agencies, public transportation operators, etc. In one embodiment, the public transport module 203 aggregates schedules of various public transport networks that are operated on fixed-route and/or fixed-schedules. In another embodiment, the public transport module 203 analyzes trajectory data (including associated timestamps) uploaded by one or more authenticated public transport passenger UE 101 and/or various public transport to determine the status of the transports that operate on fixed routes on demand. In one embodiment, the public transport module 203 may receive other related data along with the trajectory data or segment lists such as acceleration, road curvature, vehicle tilt, driving mode, brake pressure, etc. It then stores the received data to database 113 optionally in association with a unique identifier of the various public transport that transmitted the trajectory data.

The vehicle module 205 collects and/or analyzes trajectory data (including associated timestamps) as generated by one or more authenticated UE 101 and one or more vehicles 103. For example, the vehicle module 205 aggregates the trajectory data of travel segments generated by the UE 101 and the one or more vehicles 103. In one embodiment, the vehicle module 205 may receive other related data along with the trajectory data or segment lists such as acceleration, road curvature, vehicle tilt, driving mode, brake pressure, etc. It then stores the received data to database 113 optionally in association with a unique identifier of the vehicle, driver of UE 101 that transmitted the trajectory data or lists.

In one embodiment, the processing module 207 creates a dynamic virtual connection between two or more fixed transportation stations based on a dynamic location of a shared vehicle and the locations of the two or more fixed transportation stations.

In another embodiment, the processing module 207 creates the dynamic virtual connection further based on one or more exclusion zones and/or scheduling information for the user. For example, the dynamic virtual connection is calculated to avoid exclusion zones, such as parade routes, weekend pedestrian sidewalks, road work zones, etc. As another example, the processing module 207 factors in user' schedule including picking up a gift during the dynamic virtual connection, when creating the dynamic virtual connection.

In one embodiment, the processing module 207 determines the two or more fixed transportations connected by the dynamic virtual connection as a virtual station on a map of a transportation network including the two or more fixed transportation stations.

In another embodiment, the processing module 207 determines candidate routes including one or more dynamic virtual connections and/or one or more virtual stations based on their respective cost factor calculation, and recommend at least one of the candidate routes with the optimal cost factor. For example, the candidate routes are calculated to avoid exclusion zones, such as parade routes, weekend pedestrian sidewalks, road work zones, etc.

In another embodiment, the processing module 207 determines an updated location of the shared vehicle and/or an update user context/preference, and update to the one or more dynamic virtual connections, and/or the one or more virtual stations accordingly. For example, the user just receives a call from a friend requesting a cake pickup at a bakery. The processing module 207 re-computes one or more updated dynamic virtual connections, and/or one or more updated virtual stations, considering the intermediate destination (e.g., the bakery), and provides data for presenting the one or more updated dynamic virtual connections, and/or the one or more updated virtual stations to the user.

In one embodiment, the candidate routes further include an option for the vehicle to travel to the starting fixed transportation station to pick up the user before proceeding to the ending fixed transportation station.

In one embodiment, once one or more dynamic virtual connections and/or virtual stations are determined, the processing module 207 can interact with the communication module 209 and/or the user interface module 211 to present to the user the one or more dynamic virtual connections and/or virtual stations.

In another embodiment, once the candidate routes including the respective one or more dynamic virtual connections and/or virtual stations are determined, the processing module 207 can interact with the communication module 209 and/or the user interface module 211 to present to the user the candidate routes including the respective one or more dynamic virtual connections and/or virtual stations. After the user selects a candidate route and the respective one or more dynamic virtual connections and/or virtual stations, the processing module 207 can interact with the communication module 209 and/or the user interface module 211 to present to the user the transport mode and timing information, related navigation instructions, and/or other information related to the vehicle timing and vehicle navigation information. In another embodiment, the user is presented with only the transport mode segment to the one or more dynamic virtual connections and/or virtual stations.

When the shared vehicle is semi-autonomous, and/or autonomous, the processing module 207 provides to the vehicle data of the candidate route and the respective one or more dynamic virtual connections and/or virtual stations. In one embodiment, the processing module 207 provides to the shared vehicle related navigation instructions, and/or other information determined for the shared vehicle. In another embodiment, the shared vehicle uses its own on board system to generate navigation instructions and/or other information for the shared vehicle, based on the candidate route and the respective one or more dynamic virtual connections and/or virtual stations.

Since there can be delays caused by traffic, weather, etc. for the user, the fixed transportation vehicle, and/or the vehicle, the processing module 207 updates the user location, the fixed transportation vehicle location, the shared vehicle location, or a combination thereof based on data from the transportation database 113 that is obtained via real-time monitoring by the system 100.

It is further noted that the user interface module 211 may operate in connection with the communication module 209 to facilitate the exchange of real-time location information and/or transport mode information via the communication network 107 with respect to the services 109, content providers 115 and applications 111. Alternatively, the communication module 209 may facilitate transmission of the real-time location information and/or the transport mode information directly to the services 109 or content providers 115.

The above presented modules and components of the routing platform 105 can be implemented in hardware, firmware, software, or a combination thereof. Though depicted as a separate entity in FIG. 1A, it is contemplated that the platform 105 may be implemented for direct operation by respective UEs 101 and/or vehicles 103. As such, the routing platform 105 may generate direct signal inputs by way of the operating system of the UE 101 and/or vehicles 103 for interacting with the application 111. In another embodiment, one or more of the modules 201-211 may be implemented for operation by respective UEs 101 and/or vehicles 103 as a platform 105, cloud based service, or combination thereof.

Figure 3:
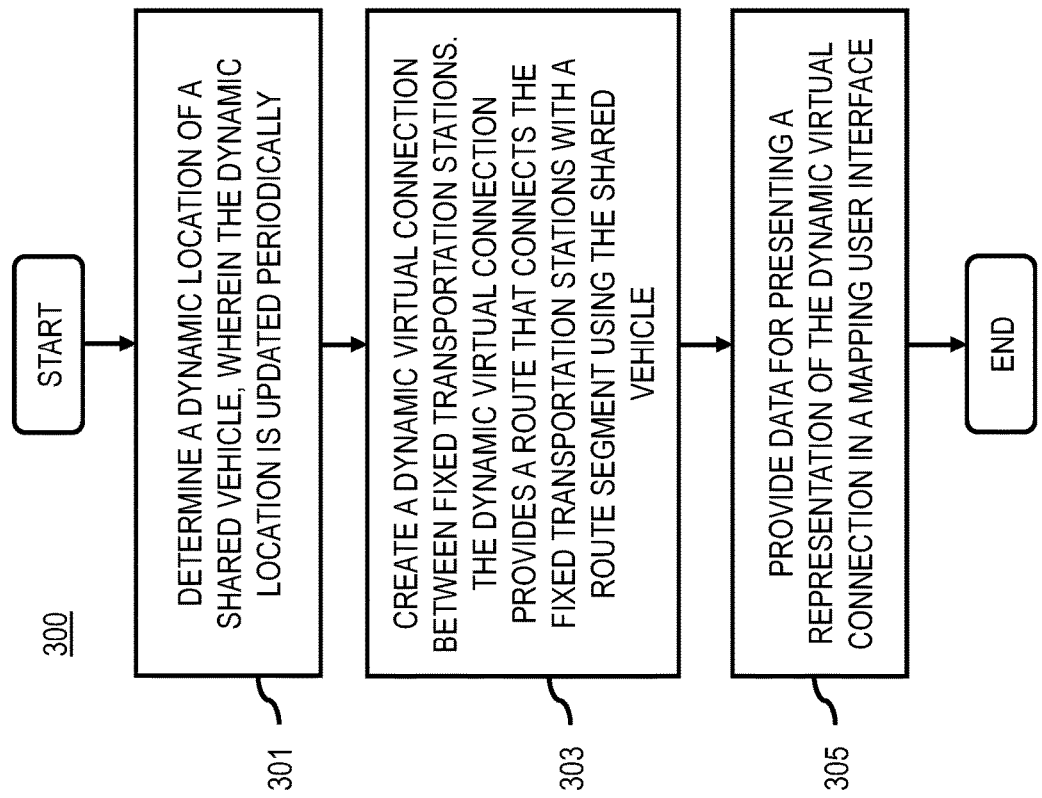
FIG. 3 is a flowchart of a process for providing a dynamic virtual connection through a shared vehicle, according to one embodiment.
Figure 4:
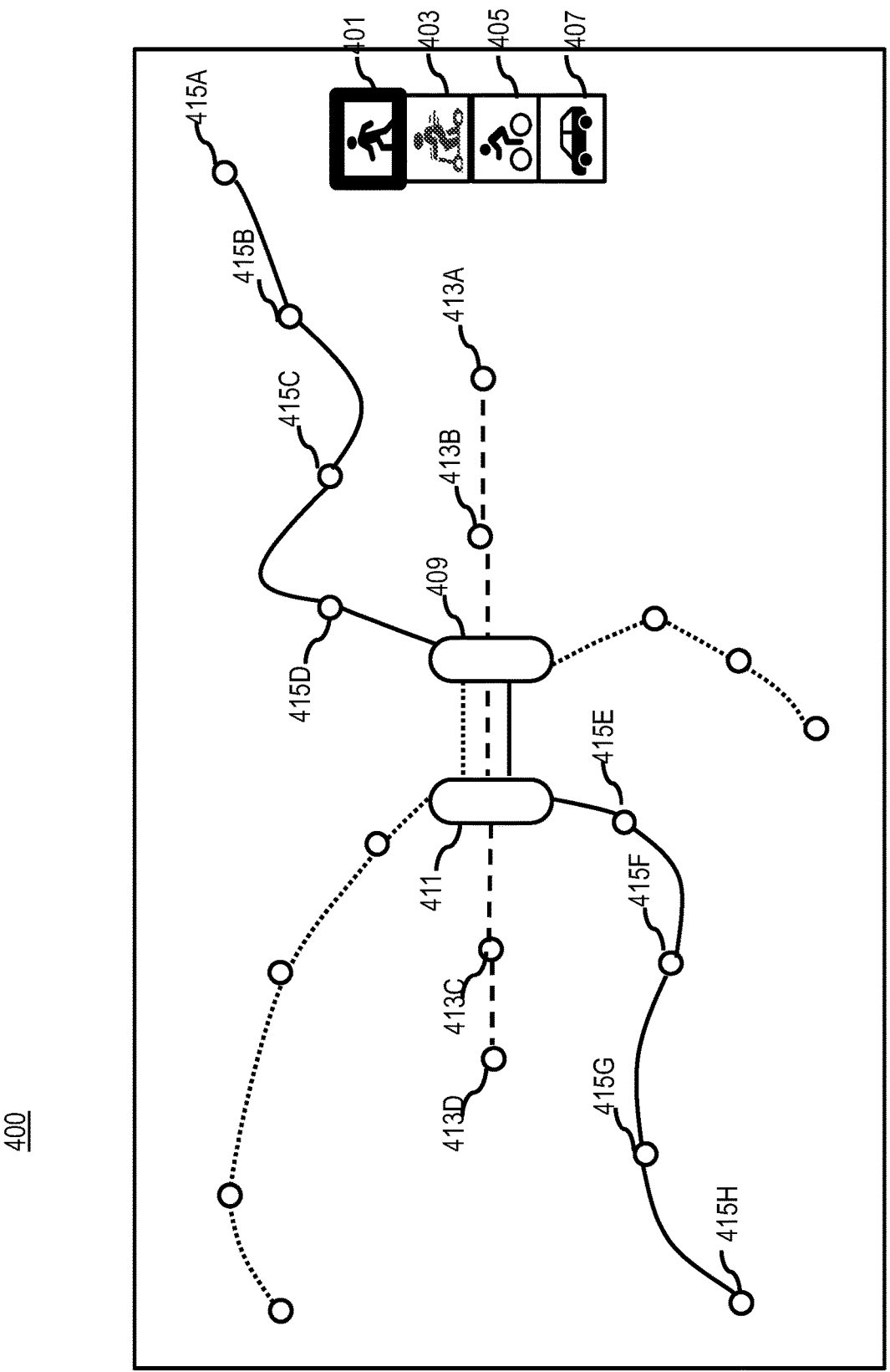
FIG. 4 is a diagram of a user interface used in a process for providing a dynamic virtual connection through a shared vehicle, according to one embodiment.
Figure 5:
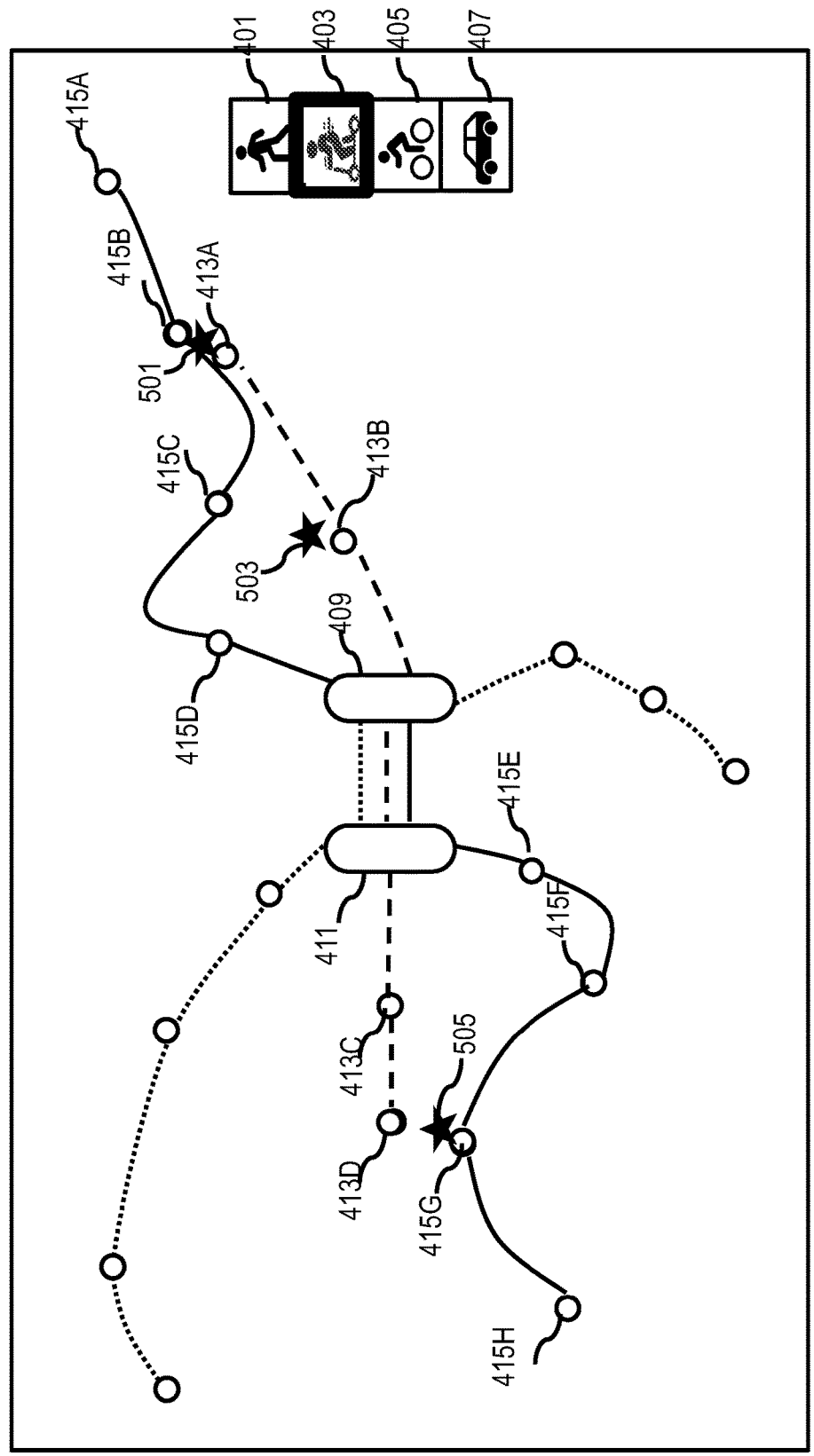
FIG. 5 is a diagram of a user interface used in a process of selecting a shared vehicle mode, according to one embodiment.
Figure 6:
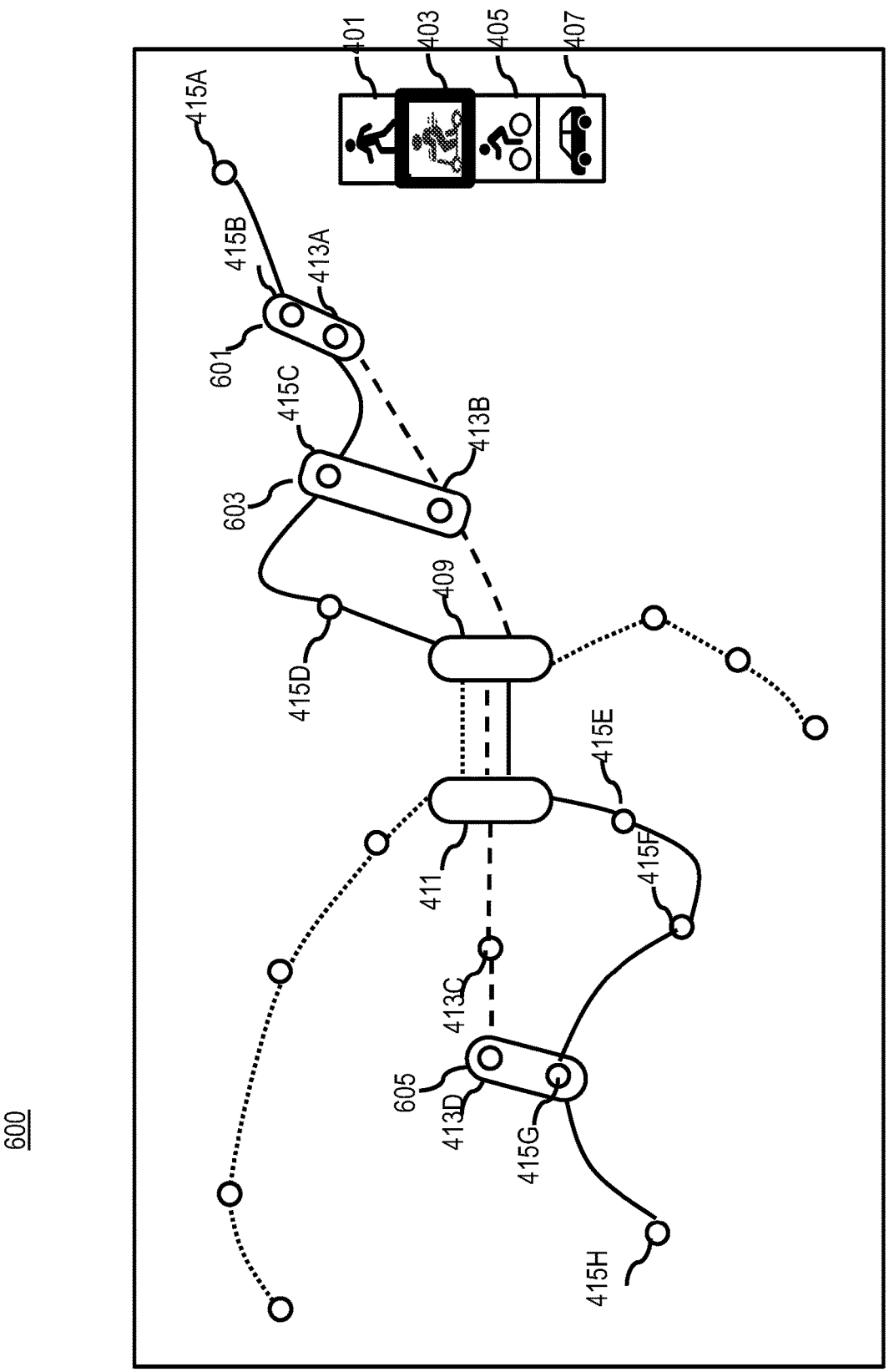
FIG. 6 is a diagram of a user interface depicting dynamic virtual connections of the selected shared vehicle mode, according to one embodiment.
Figure 9:
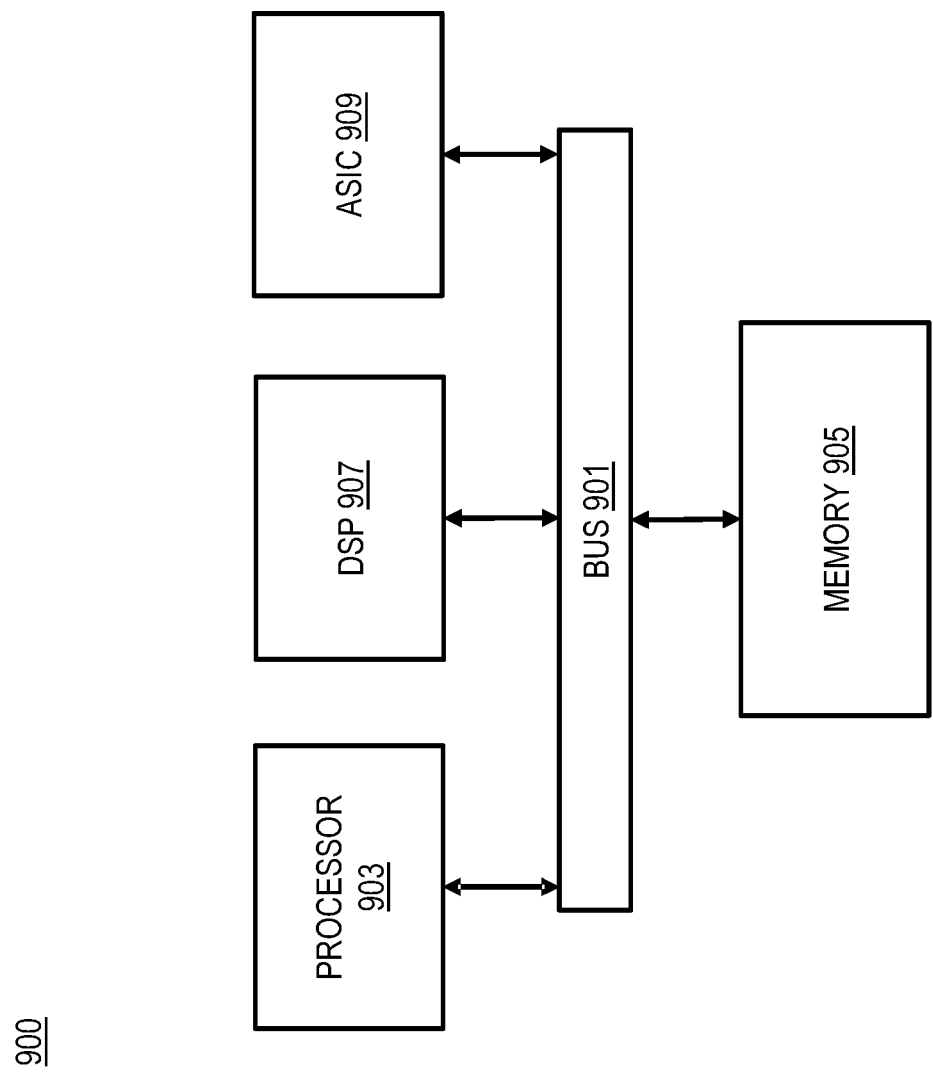
FIG. 9 is a diagram of a chip set that can be used to implement an embodiment of the invention.

FIG. 3 is a flowchart of a process for providing a dynamic virtual connection through a shared vehicle, according to one embodiment. In one embodiment, the routing platform 105 performs the process 300 and is implemented in, for instance, a chip set including a processor and a memory as shown in FIG. 9. In addition or alternatively, all or a portion of the process 300 may be performed locally at the UE 101 and/or vehicle 103 (e.g., via the application 111 or another equivalent hardware and/or software component). The process 300 will be described using FIGS. 4-6 as examples. FIGS. 4-6 are diagrams of user interfaces used in the processes 300 for providing a dynamic virtual connection through a shared vehicle, according to various embodiments.

In one embodiment, FIG. 4 shows a user interface 400 with a transit network and four transport modes: a walking mode 401, a shared electric scooter mode 403, a shared bicycle mode 405, and a shared car mode 407. For example, the transit network includes three different transit lines meeting at two stations 409 and 411: a transit line 413 (in a broken line), a transit line 415 (in a solid line), and a transit line (in a dot line and not numbered). The transit line 413 passes four other stations 413A, 413B, 413C, and 413D. The transit line 415 passes eight other stations 415A, 415B, 415C, 415D, 415E, 415F, 415G, and 415H. The un-numbered transit line passes seven other stations. In FIG. 4, the transit mode is set as the walking mode 401, and the transit network can be any fixed public transit network, such as buses, trains, subways, etc. In other examples, the different transport modes and/or different transit lines may be differentiated with various colors, styles, graphic designs, etc.

In step 301, the routing platform 105 determines a dynamic location of a shared vehicle, wherein the dynamic location is updated (e.g., periodically). FIG. 5 is a diagram of a user interface used in a process of selecting a shared vehicle mode, according to one embodiment. In one embodiment, FIG. 5 shows a user interface 500 with the transit network and the four transport modes of FIG. 4, while the transit mode is set as the shared electric scooter mode 403. In FIG. 5, three shared electric scooters 501, 503, and 505 are located (1) within a threshold user walking distance (e.g., 200 feet) from one starting fixed transportation station, and (2) within a threshold user traveling distance (e.g., 2 miles) from one starting fixed transportation station to one ending fixed transportation station.

In step 303, the routing platform 105 creates a dynamic virtual connection between two or more fixed transportation stations, wherein the dynamic virtual connection provides a route that connects the two or more fixed transportation stations with a route segment using the shared vehicle, and wherein the dynamic virtual connection is updated as the dynamic location of the shared vehicle is updated. FIG. 6 is a diagram of a user interface depicting dynamic virtual connections of the selected shared vehicle mode, according to one embodiment. In one embodiment, FIG. 6 shows a user interface 600 with the transit network and the transit mode set as the shared electric scooter mode 403 as in FIG. 5, and three dynamic virtual connections 601, 603, and 605 respectively created between the stations 413A, 415B, the stations 413*b*, 415C, and the stations 415G, 413D.

In step 305, the routing platform 105 provides data for presenting a representation of the dynamic virtual connection in a mapping user interface as shown in FIG. 6. In one embodiment, the user can trigger the display of detailed information of a dynamic virtual connection (e.g., the names of the starting and ending fixed transportation stations, an estimated arrival time at the starting fixed transportation station, a location/model/operator/cost of the shared vehicle, an estimated arrive time to travel using the shared vehicle to the ending fixed transportation station, a departure time from the ending fixed transportation station, etc.), by selecting that dynamic virtual connection.

In another embodiment, the routing platform 105 presents three dynamic virtual connections 601, 603, and 605 including their respective starting and ending fixed stations as three virtual stations 601, 603, and 605 in the same format or another format with different colors, styles, and/or graphic designs.

In one embodiment, the routing platform 105 presents candidate routes and respective dynamic virtual connection and/or virtual stations coded with different colors, styles, and/or graphic designs on a mapping user for the user to select the navigation route.

In another embodiment, the routing platform 105 presents the candidate routes and respective transport modes in an order based on the cost function, user preferences, and/or user context, etc. for the user to select the navigation route.

Figure 7:
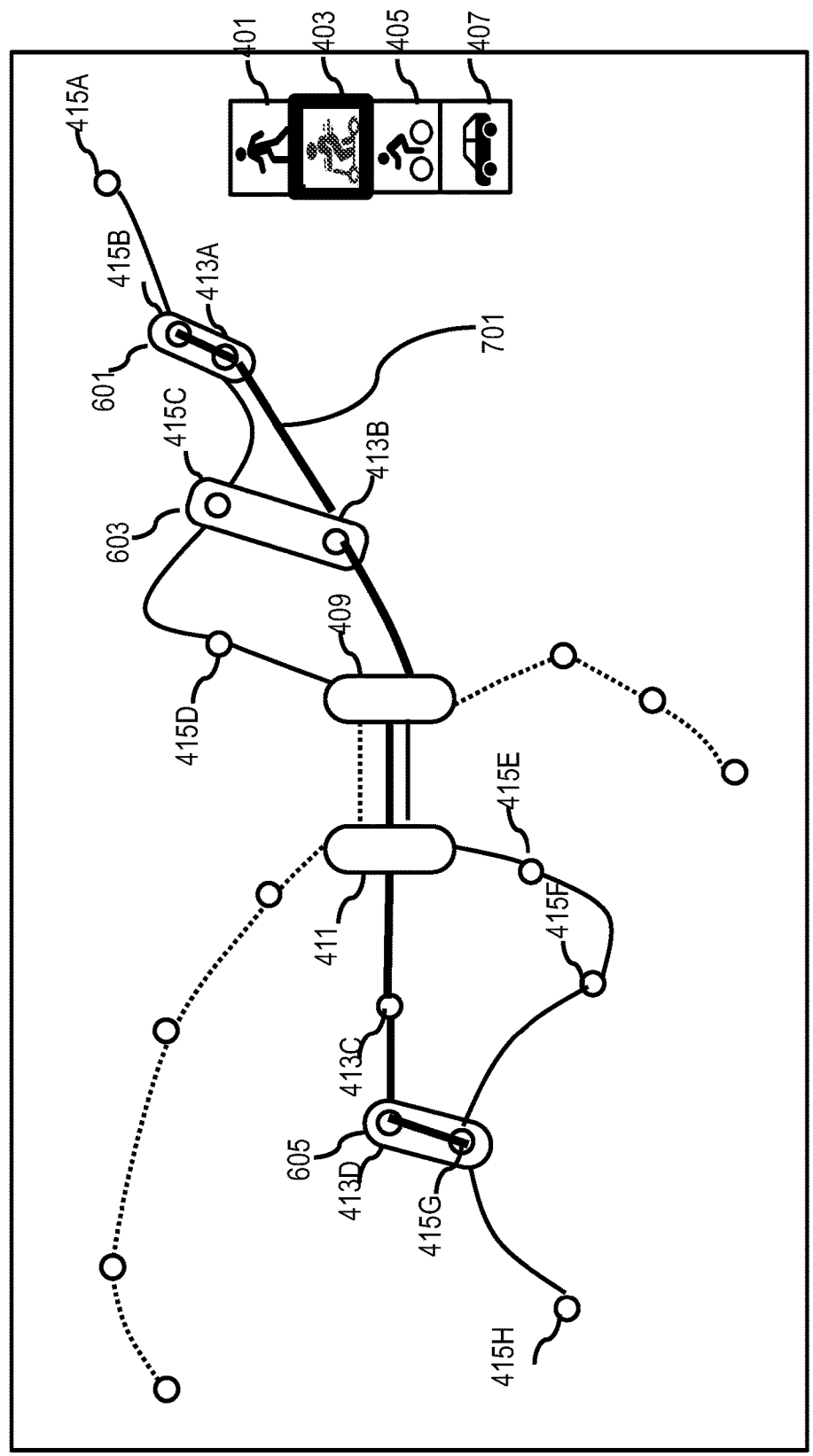
FIG. 7 is a diagram of a user interface depicting an optimal candidate route and respective intermediate dynamic virtual connections and stations, according to one embodiment.

FIG. 7 is a diagram of a user interface 700 depicting an optimal candidate route 701 and respective intermediate dynamic virtual connections and stations, according to one embodiment. For example, the optimal candidate route 701 is the shortest, fastest, and/or cheapest route from Station 415B to Station 415G, comparing with other options, such as taking the transit line 415 all the way from Station 415B via Stations 415C, 415D, 409, 411, 415E, 415F, to Station 415G. In particular, the optimal candidate route 701 from Station 415B via the virtual connection 601, Stations 413B, 409, 411, 413C, and the virtual connection 605 to Station 415G.

In one embodiment, the user can trigger the display of detailed information of an optimal candidate route (e.g., the names of the passing via transportation stations, dynamic virtual connections, and/or virtual stations, an estimated arrival time at each of the transportation stations, the dynamic virtual connections, and/or the virtual stations, a location/model/operator/cost of each shared vehicle, an estimated arrive time to travel using each shared vehicle to a respective ending fixed transportation station, a departure time from the respective ending fixed transportation station, etc.), by selecting that optimal candidate route.

The computation of the different embodiments mentioned previously can be done partially or totally on servers/cloud, or at the edge of the network in order to balance the network load/cellular usage.

The above-discussed embodiments dynamically generate urban maps highlighting shared vehicles as dynamic virtual connections and/or virtual stations that enable fixed public transportation station connections.

The above-discussed embodiments create personal maps of areas/cities which leverage the readiness of a user to use shared vehicles in conjunction with fixed public transportation networks and combine shared devices with public transport networks in a natural way.

The above-discussed embodiments create new "virtual shortcuts" by the presence of shared vehicles in a public transport map, and dynamically redraw the public transport based on this dynamic and/or real-time information of the shared vehicles, the fixed public transportation networks, user context, and/or user preferences.

The above-discussed embodiments provide flexibility with shared vehicles that replace short travel segments between fixed transportation stations and/or extending from between fixed transportation stations that cost lots of time for little distance/progress.

The above-discussed embodiments compute personalized routes considering available shared vehicles and user's own bike (or roller) at a fixed transportation station in order to make the last mile more efficiently.

The above-discussed embodiments provide a dedicated user interface for such dynamic virtual connections and/or virtual stations so the user is able to have an overview on the virtual connections and the connection times.

The above-discussed embodiments effectively move the fixed stations closer to each other by reducing travel time, i.e., allowing the user to utilizing shared vehicles that are more widely available to arrive faster from one fixed transportation station to another.

The above-discussed embodiments allow users to optimize travel time by considering the most efficient and cost effective combination of all possible transport mode (including walking, public transport, etc.) together with the dynamic virtual connections and/or virtual stations.

The above-discussed embodiments real-time monitor the travel status of the user and the vehicle and adjust the dynamic virtual connections and/or virtual stations, and a navigation route accordingly (e.g., in case of traffic delays).

The above-discussed embodiments combine different technologies (sensors, predictive parking, probability computation, intermodal and multimodal routing, etc.) to provide a platform for mobility providers to share their data and get insights of dynamic virtual connections and/or virtual stations via combining many types of data sets, thereby determining multi and intermodal transport solutions.

The processes described herein for providing a dynamic virtual connection through a shared vehicle may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
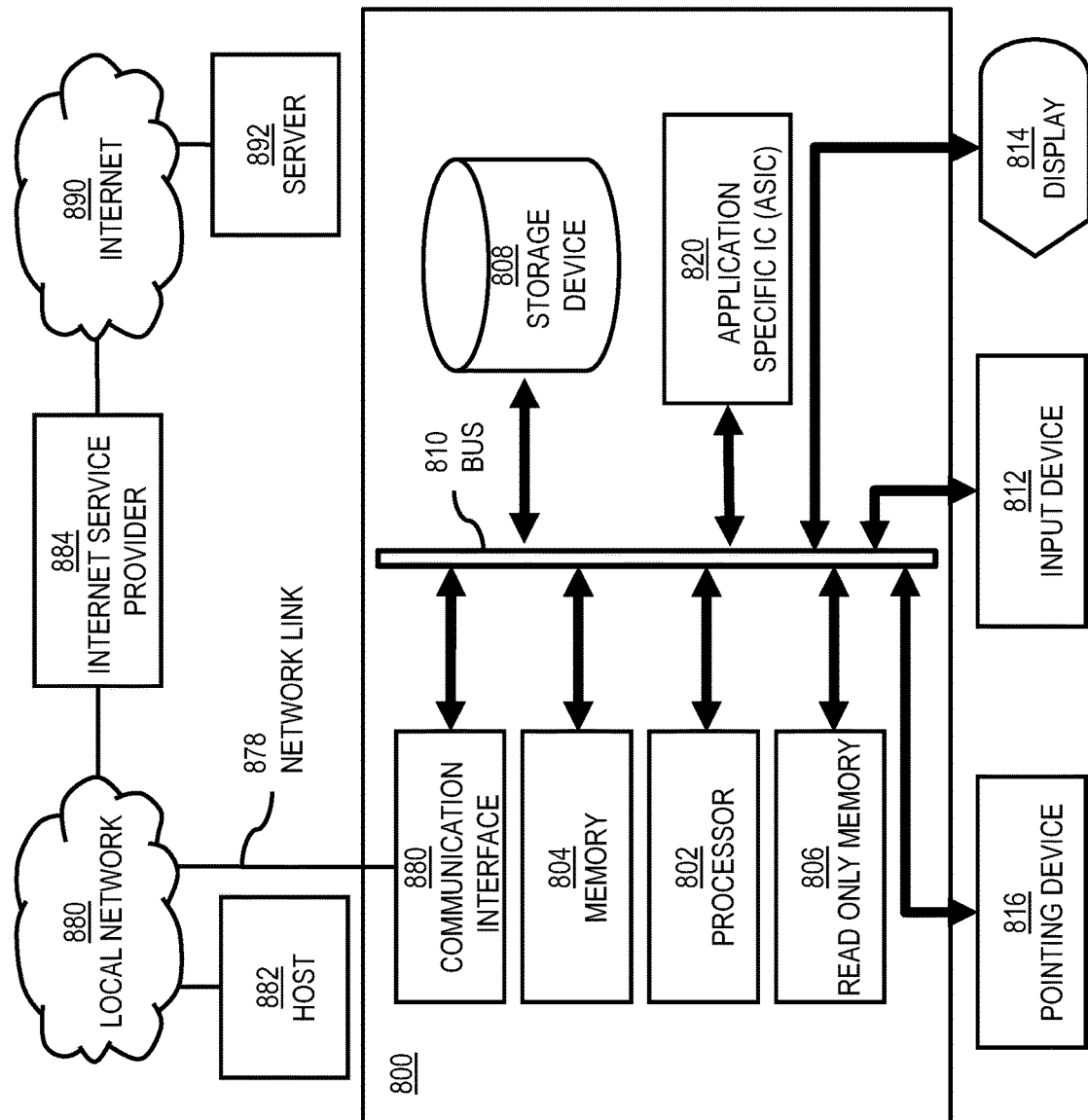
FIG. 8 is a diagram of hardware that can be used to implement an embodiment of the invention.

FIG. 8 illustrates a computer system 800 upon which an embodiment of the invention may be implemented.

Although computer system 800 is depicted with respect to a particular device, it is contemplated that other devices (e.g., network elements, servers, etc.) within FIG. 8 can deploy the illustrated hardware and components of system 800. Computer system 800 is programmed (e.g., via computer program code or instructions) to provide a dynamic virtual connection through a shared vehicle as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing a dynamic virtual connection through a shared vehicle.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing a dynamic virtual connection through a shared vehicle. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for providing a dynamic virtual connection through a shared vehicle. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing a dynamic virtual connection through a shared vehicle, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 880 coupled to bus 810. Communication interface 880 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 880 may be a parallel port or a serial port or a universal serial bus (USB) port on a personal computer. In some embodiments, communications interface 880 is an integrated services digital network (ISDN) card or a digital subscriber line (DSL) card or a telephone modem that provides an information communication connection to a corresponding type of telephone line. In some embodiments, a communication interface 880 is a cable modem that converts signals on bus 810 into signals for a communication connection over a coaxial cable or into optical signals for a communication connection over a fiber optic cable. As another example, communications interface 880 may be a local area network (LAN) card to provide a data communication connection to a compatible LAN, such as Ethernet. Wireless links may also be implemented. For wireless links, the communications interface 880 sends or receives or both sends and receives electrical, acoustic or electromagnetic signals, including infrared and optical signals, that carry information streams, such as digital data. For example, in wireless devices, such as mobile computers like vehicle infotainment system, the communications interface 880 includes a radio band electromagnetic transmitter and receiver called a radio transceiver. In certain embodiments, the communications interface 880 enables connection to the communication network 107 for providing a dynamic virtual connection through a shared vehicle to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 880, carry information to and from computer system 800. Computer system 800 can send and receive information, including program code, through the networks 880, 890 among others, through network link 878 and communications interface 880. In an example using the Internet 890, a server host 892 transmits program code for a particular application, requested by a message sent from computer 800, through Internet 890, ISP equipment 884, local network 880 and communications interface 880. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 880 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide a dynamic virtual connection through a shared vehicle as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing a dynamic virtual connection through a shared vehicle.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide a dynamic virtual connection through a shared vehicle. The memory 905 also stores the data associated with or generated by the execution of the inventive steps.

Figure 10:
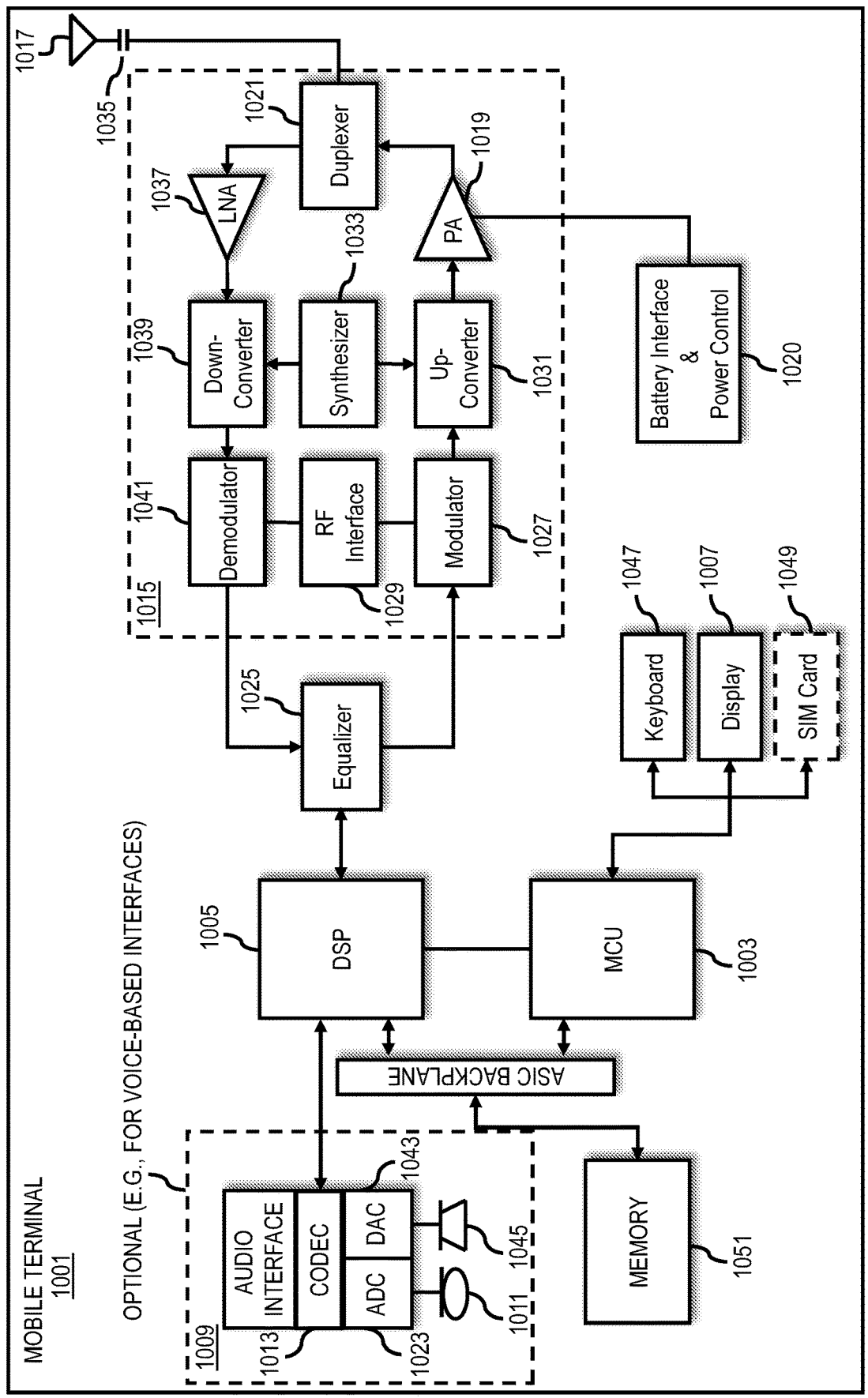
FIG. 10 is a diagram of a mobile terminal (e.g., mobile computer) that can be used to implement an embodiment of the invention.

FIG. 10 is a diagram of exemplary components of a mobile terminal (e.g., mobile computers such as vehicle infotainment system, vehicle embedded system, smartphones, etc.) for communications, which is capable of operating in the system of FIG. 1, according to one embodiment. In some embodiments, mobile terminal 1001, or a portion thereof, constitutes a means for performing one or more steps of providing a dynamic virtual connection through a shared vehicle. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile computer or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile computer or a similar integrated circuit in network device (e.g., a cellular network device or data other network devices).

Pertinent internal components of the mobile terminal include a Main Control Unit (MCU) 1003, a Digital Signal Processor (DSP) 1005, and a receiver/transmitter unit. In one embodiment, wherein voice-based interaction and/or communications are supported at the mobile terminal, the mobile terminal may also include a microphone gain control unit and a speaker gain control unit. A main display unit 1007 provides a display to the user in support of various applications and mobile terminal functions that perform or support the steps of providing a dynamic virtual connection through a shared vehicle. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. In embodiments supporting voice-based interactions and/or communications, an audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station (e.g., data and/or voice communications), which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, data to support providing a dynamic virtual connection through a shared vehicle is formatted into network packets (e.g., Internet Protocol (IP) packets) for transmission using one or more network transmission protocol (e.g., a cellular network transmission protocol described in more detail below). In one embodiment, the network packets include control information and payload data, with the control information specifying originating/destination network addresses, error control signals, signals for reconstructing the user data from the packets, and/or other related information. In embodiments supporting voice-based interaction and/or communications, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech recognition, speech encoding, channel encoding, encrypting, and interleaving.

In one embodiment, the processed network packets and/or voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission through the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The local base station or similar component then forwards data or network packets to a gateway server (e.g., a gateway to the Internet) for connectivity to network components used for providing shared vehicle availability detection. In embodiments supporting voice-based interactions and/or communications, voice signals may be forwarded from the local base station to a remote terminal which may be another mobile computer, cellular telephone, and/or any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide a dynamic virtual connection through a shared vehicle. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details (e.g., data and/or voice subscriptions), and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for providing a dynamic virtual connection through a shared vehicle comprising:
   determining a dynamic location of the shared vehicle within a threshold distance from a fixed transportation station, wherein the dynamic location is updated;
   creating the dynamic virtual connection between two or more fixed transportation stations that include the fixed transportation station, wherein the dynamic virtual connection provides a route that connects the two or more fixed transportation stations with a route segment using the shared vehicle, and wherein the dynamic virtual connection is updated as the dynamic location of the shared vehicle is updated; and
   providing data for presenting a graphic representation of the dynamic virtual connection in a mapping user interface when no routing request is set or known.

2. The method of claim 1, wherein the graphic representation of the dynamic virtual connection graphically differentiates the dynamic virtual connection from a non-dynamic connection between the two or more fixed transportation stations on a map of one public transit network including the two or more fixed transportation stations.

3. The method of claim 1, wherein the graphic representation of the dynamic virtual connection is presented based on determining that the dynamic virtual connection reduces a travel time, a travel distance, or a combination thereof between the two or more fixed transportation stations in comparison to a non-dynamic route between the two or more fixed transportation stations.

4. The method of claim 1, wherein the dynamic location is updated in a real-time or in substantially real-time based on the dynamic location of the shared vehicle.

5. The method of claim 4, further comprising:
determining an availability of the shared vehicle from a vehicle sharing service,
wherein the selecting of the shared vehicle is further based on the availability.

6. The method of claim 1, further comprising:
determining a dynamic location of a personal vehicle associated with a user,
wherein the dynamic virtual connection is created based on the dynamic location of the personal vehicle.

7. The method of claim 1, wherein the dynamic virtual connection between the two or more fixed transportation stations is further based on at least one of:
a distance between the shared vehicle and the two or more fixed transportation stations;
an ease of using the shared vehicle to connect the two or more fixed transportation stations; and
a type of transport provided by the two or more fixed transportation stations being connected.

8. The method of claim 7, wherein the dynamic virtual connection is further based on a user preference with respect to at least one of:
a vehicle type of the shared vehicle;
the vehicle type that is preferred based on a selected distance;
a vehicle brand of the shared vehicle;
a vehicle sharing service providing the shared vehicle;
a maximum distance from a first station of the two or more fixed transportation stations and the shared vehicle; and
a maximum distance covered between the two or more fixed transportation stations using the shared vehicle.

9. The method of claim 1, wherein the graphic representation of the dynamic virtual connection in the mapping user interface depicts each of the two or more fixed transportation stations connected by the dynamic virtual connection as a virtual joint station on a map of one public transit network including the two or more fixed transportation stations, and wherein the virtual joint station graphically differentiates from a real-world joint station of the public transit network in the map.

10. The method of claim 1, wherein the mapping user interface is redrawn on a display device based on the updating of the dynamic location of the shared vehicle, the dynamic virtual connection, or a combination thereof.

11. An apparatus for providing a dynamic virtual connection through a shared vehicle, comprising:
at least one processor; and
at least one memory including computer program code for one or more programs,
the at least one memory and the computer program code configured to, with the at least one processor, cause the apparatus to perform at least the following:
determine a dynamic location of the shared vehicle within a threshold distance from a fixed transportation station, wherein the dynamic location is updated;
create the dynamic virtual connection between two or more fixed transportation stations that include the fixed transportation station, wherein the dynamic virtual connection provides a route that connects the two or more fixed transportation stations with a route segment using the shared vehicle, and wherein the dynamic virtual connection is updated as the dynamic location of the shared vehicle is updated; and
provide data for presenting a graphic representation of the dynamic virtual connection in a mapping user interface when no routing request is set or known.

12. The apparatus of claim 11, wherein the graphic representation of the dynamic virtual connection graphically differentiates the dynamic virtual connection from a non-dynamic connection between the two or more fixed transportation stations on a map of one public transit network including the two or more fixed transportation stations.

13. The apparatus of claim 11, wherein the graphic representation of the dynamic virtual connection is presented based on determining that the dynamic virtual connection reduces a travel time, a travel distance, or a combination thereof between the two or more fixed transportation stations in comparison to a non-dynamic route between the two or more fixed transportation stations.

14. The apparatus of claim 11, wherein the dynamic location is updated in a real-time or in substantially real-time based on the dynamic location of the shared vehicle.

15. The apparatus of claim 14, wherein the apparatus is further caused to:
determine an availability of the shared vehicle from a vehicle sharing service,
wherein the selecting of the shared vehicle is further based on the availability.

16. The apparatus of claim 11, wherein the apparatus is further caused to:
determine a dynamic location of a personal vehicle associated with a user,
wherein the dynamic virtual connection is created based on the dynamic location of the personal vehicle.

17. The apparatus of claim 11, wherein the dynamic virtual connection between the two or more fixed transportation stations is further based on at least one of:
a distance between the shared vehicle and the two or more fixed transportation stations;
an ease of using the shared vehicle to connect the two or more fixed transportation stations; and
a type of transport provided by the two or more fixed transportation stations being connected.

18. A non-transitory computer-readable storage medium for providing a dynamic virtual connection through a shared vehicle carrying one or more sequences of one or more instructions which, when executed by one or more processors, cause an apparatus to at least perform the following steps:
determining a dynamic location of the shared vehicle within a threshold distance from a fixed transportation station, wherein the dynamic location is updated;
creating the dynamic virtual connection between two or more fixed transportation stations that include the fixed transportation station, wherein the dynamic virtual connection provides a route that connects the two or more fixed transportation stations with a route segment using the shared vehicle, and wherein the dynamic virtual connection is updated as the dynamic location of the shared vehicle is updated; and providing data for presenting a graphic representation of the dynamic virtual connection in a mapping user interface when no routing request is set or known.

19. The non-transitory computer-readable storage medium of claim 18, wherein the graphic representation of the dynamic virtual connection graphically differentiates the dynamic virtual connection from a non-dynamic connection between the two or more fixed transportation stations on a map of one public transit network including the two or more fixed transportation stations.

20. The non-transitory computer-readable storage medium of claim 18, wherein the graphic representation of the dynamic virtual connection is presented based on determining that the dynamic virtual connection reduces a travel time, a travel distance, or a combination thereof between the two or more fixed transportation stations in comparison to a non-dynamic route between the two or more fixed transportation stations.

* * * * *